United States Patent [19]

Brownfield

[11] Patent Number: 4,934,405
[45] Date of Patent: Jun. 19, 1990

[54] SAFETY VALVE

[76] Inventor: Elmer E. Brownfield, 410 E. 4th St., Lefors, Tex. 79054

[21] Appl. No.: 297,035

[22] Filed: Jan. 17, 1989

[51] Int. Cl.⁵ .............................................. F16K 15/06
[52] U.S. Cl. ................................. 137/517; 137/533.29
[58] Field of Search ...................... 137/454.5, 498, 517, 137/533.21, 533.29

[56] References Cited

U.S. PATENT DOCUMENTS

| | | | |
|---|---|---|---|
| 1,213,108 | 1/1917 | Keynton | 137/533.29 |
| 2,917,077 | 12/1959 | Ziege | 137/517 X |
| 4,766,927 | 8/1988 | Conatser | 137/454.5 X |

FOREIGN PATENT DOCUMENTS 603049  3/1960  Italy ................................ 137/533.21

Primary Examiner—Robert G. Nilson

[57] ABSTRACT

A safety valve wherein the downstream end of the body has a threaded portion for securing the safety valve to a high pressure tank. The downstream end of the body also has a passage therethrough interconnecting the downstream end with the upstream end. A portion of the passage adjacent the downstream end of the safety valve includes a threaded portion for receiving a service valve.

4 Claims, 1 Drawing Sheet

SAFETY VALVE

BRIEF SUMMARY OF THE INVENTION

1. Field of Invention.

The present invention relates generally to safety valves.

2. Background of the Invention.

The present invention provides an economical and universal system for securing a safety valve to a high pressure source, such as a high pressure tank or a high pressure line, such that a receiving structure, such as a service valve, may be secured to the safety valve without further modification to the receiving structure.

DETAILED DESCRIPTION OF THE INVENTION

Figure 1:
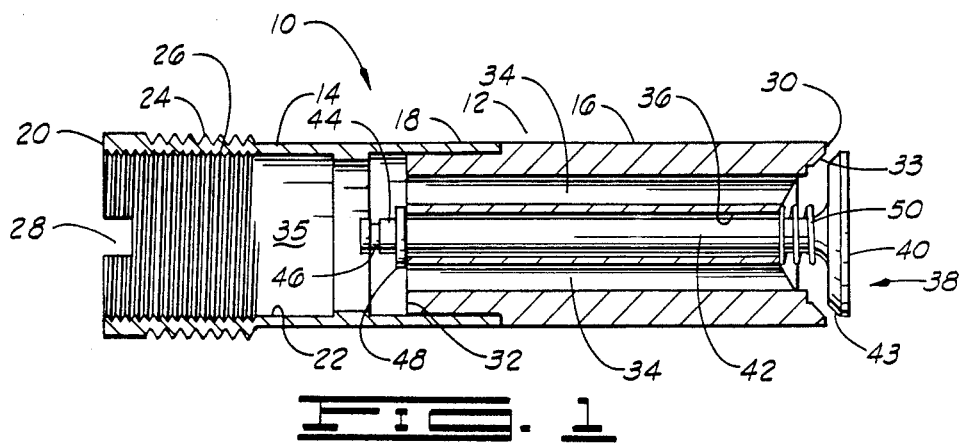
FIG. 1 is a longitudinal cross-sectional view through a safety valve constructed pursuant to this invention.
Figure 3:
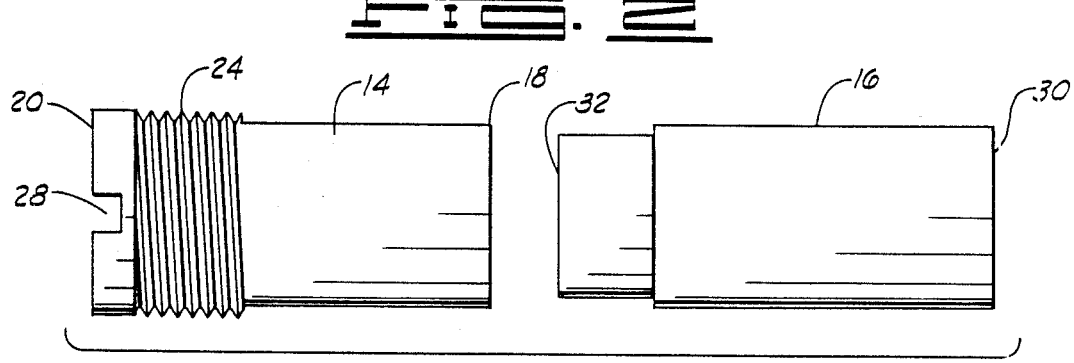
FIG. 3 is an exploded side elevational view of the valve body.

Referring to the drawings in detail, and particularly FIG. 1, reference character 10 generally designates a safety valve constructed pursuant to this invention. The safety valve 10 has a valve body 12 including a first part 14 and a second part 16 (FIG. 3).

The first part 14 has an upstream end 18; a downstream end 20, and a bore 22 therethrough interconnecting the upstream end 18 with the downstream end 20. At the downstream end 20, the first part 14 includes an outer threaded portion 24 for securing the valve body 12 to a high pressure tank, such as an oxygen tank, (not shown) by engaging a cooperatively sized threaded bore thereon. The bore 22 adjacent the downstream end 20 has a threaded portion 26 extending for a distance therein. A cooperatively sized threaded portion of a service valve (not shown) engages the threaded portion 26 for securing the service valve to the safety valve 10. The downstream end 20 also includes a transverse slot 28 therein for use with a cooperatively sized tool, such that the safety valve 10 may be firmly secured to a high pressure tank.

The second part 16 has an upstream end 30 and a downstream end 32. The downstream end 32 of the second part 16 is sized for tight, frictional mating engagement within the bore 22 at the upstream end 18 of the first part 14. In this way, the second part 16 is secured to the first part 14. The upstream end 30 of the second part 16 includes portions thereon defining a valve seat 33.

Figure 2:
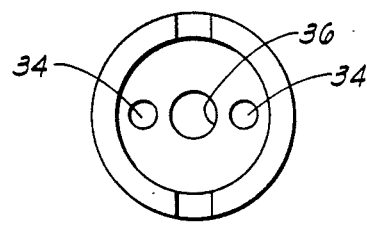
FIG. 2 is an end view of the left hand end of the safety valve body of the valve of FIG. 1.

As shown in FIGS. 1 and 2, the second part further includes a pair of material bores 34 interconnecting the upstream end 30 with the downstream end 32. The material bores 34, in combination with the bore 22, form a passage 35 for conveying material through the valve 10. The second part 16 further includes a valve stem bore 36 positioned between the material bores 34 and extending between the upstream end 30 and the downstream end 32 of the second part 16.

Figure 5:
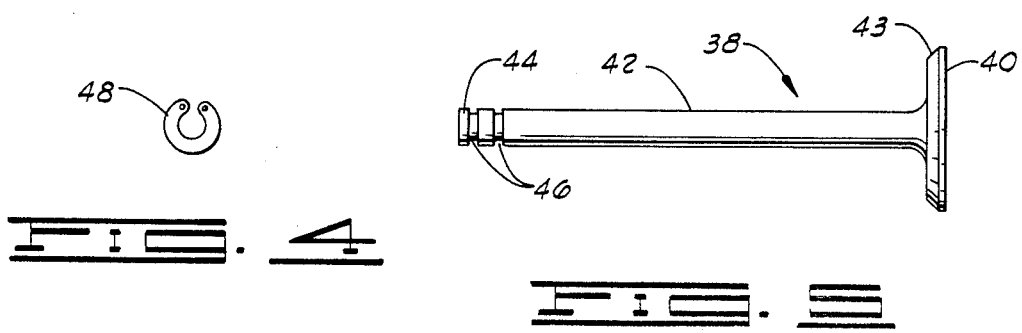
FIG. 5 is a side elevational view of the valve member of the valve of FIG. 1.

The safety valve 10 also includes a valve member 38 slidably secured therein for movement between an open position (FIG. 1) and a closed position (not shown). The valve member 38 has a valve head 40 and a stem 42 secured to the head 40. The valve head 40 has a seating face 43 sized for engaging the valve seat 33 for sealing the upstream end 30 of the safety valve 10 when the valve member 38 is in the closed position. The free end 44 of the stem 42 includes a pair of spaced annular grooves 46 therein (FIG. 5).

Figure 4:
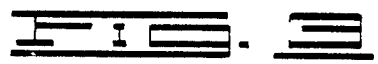
FIG. 4 is a plan view of a snap ring.

The stem 42 is slidably inserted into the valve stem bore 36 such that the grooves 46 of the stem 42 extend into the bore 22. The valve member 38 is retained within the valve body 12 by a snap ring 48 (FIG. 4) in one of the grooves 46.

A coil spring 50 surrounds the stem 42 adjacent the head 40. The coil spring 50 normally biases the valve 38 in an open position, such that the seating face 43 of the valve 38 is spaced a distance from the valve seat 33. The snap ring 44 engages the end o 32 of the body part 12 when the valve 10 is open to prevent loss of the valve member 38.

In operation, the safety valve 10 is normally maintained in an open position by the action of the coil spring 50. In the open position, a controlled flow of pressurized material from a high pressure tank in which the valve 10 in installed is permitted to enter the upstream end 30 and exit the downstream end 20 into a service valve secured in the threads 26 of the safety valve 10. However, in the event the service valve is broken off, the pressure differential across the valve head 40 resulting from an increased flow of pressurized material exiting the high pressure tank over comes the force of the coil spring 50 such that the valve member 38 moves downstream until the seating face 43 engages the valve seat 33 and closes the safety valve 10. In this way, the uncontrolled flow of pressurized material from the high pressure tank is prevented.

Changes may be made in the construction, operation, and arrangement of the various parts, elements, and procedures described herein without departing from the spirit and scope of the present invention as defined in the following claims.

I claim:

1. A safety valve comprising:

a valve body having a first part and a second part wherein the first part has an upstream end and a downstream end and a bore therethrough interconnecting the upstream end of the first part and the downstream end of the first part, the downstream end has an outer threaded portion, the bore has an threaded portion adjacent the downstream end of the first part, the second part has an upstream end and a downstream end and a plurality of bores therethrough interconnecting the upstream end of the second part and the down stream end of the second part, a portion of the downstream end of the second part frictional engages the wall of the bore near the upstream end of the first part such that the first and second parts are secured together, and a passage is formed between the upstream end of the second part and the downstream end of the first part.

a valve member having a head and a stem secured to the head, wherein the stem is sized for insertion into one of the bores in the second part such that a portion of the stem extends into the first part bore, the valve is supported within the second part for movement between an open position and a closed position, and the head is sized for overlying the upstream end of the second part such that when the valve is in a closed position, the upstream end of the second part is sealed;

a snap ring secured to the portion of the stem extending into the bore in the first part for retaining the valve within the second part; and a coil spring disposed between the upstream end of the second part and the head of the valve member for biasing the valve in the open position.

2. A safety valve as defined in claim 1 wherein the downstream end of the first part is further characterized by a transverse slot therein for use with a cooperatively sized tool for securing the safety valve to a receiving structure.

3. A safety valve comprising:

a valve body having separable first and second parts, wherein the first part has an upstream end and a downstream end and a bore therethrough interconnecting the upstream end of the first part and the downstream end of the first part, and wherein the second part has a upstream end and a downstream end and a plurality of bores therein, and wherein at least one of the bores therein interconnects the upstream end of the first part and the downstream end of the second part;

means for securing the upstream end of the first part to the downstream end of the second part, wherein the bore of the first part communicates with at least one of the bores of the second part such that a passage, extending substantially the length of the valve body, is formed;

a valve slidably secured within the second part for movement between an open position and a closed position such that when the valve is in a closed position, the upstream end of the second part is sealed;

means for retaining the valve within the valve body;

means for biasing the valve in the open position; and means for securing the first part thereof to a high pressure source, characterized by the downstream end of the first part having outer threads thereon.

4. A safety valve comprising:

a valve body having separable first and second parts, wherein the first part has an upstream end and a downstream end and a bore therethrough interconnecting the upstream end of the first part and the downstream end of the first part, and wherein the second part has a upstream end and a downstream end and a plurality of bores therein, and wherein at least one of the bores therein interconnects the upstream end of the first part and the downstream end of the second part;

means for securing the upstream end of the first part to the downstream end of the second part, wherein the bore of the first part communicates with at least one of the bores of the second part such that a passage, extending substantially the length of the valve body, is formed;

a valve slidably secured within the second part for movement between an open position and a closed position such that when the valve is in a closed position, the upstream end of the second part is sealed;

means for retaining the valve within the valve body; and means for biasing the valve in the open position;

wherein the downstream end of the first part is further characterized by a transverse slot therein for use with a cooperatively sized tool for securing the safety valve to a receiving structure.

* * * * *